Dec. 27, 1949   P. SCHLUMBOHM   2,492,892
ROUNDED BOTTOM INNER DISH FOR DOUBLE BOILERS
Filed Feb. 11, 1944
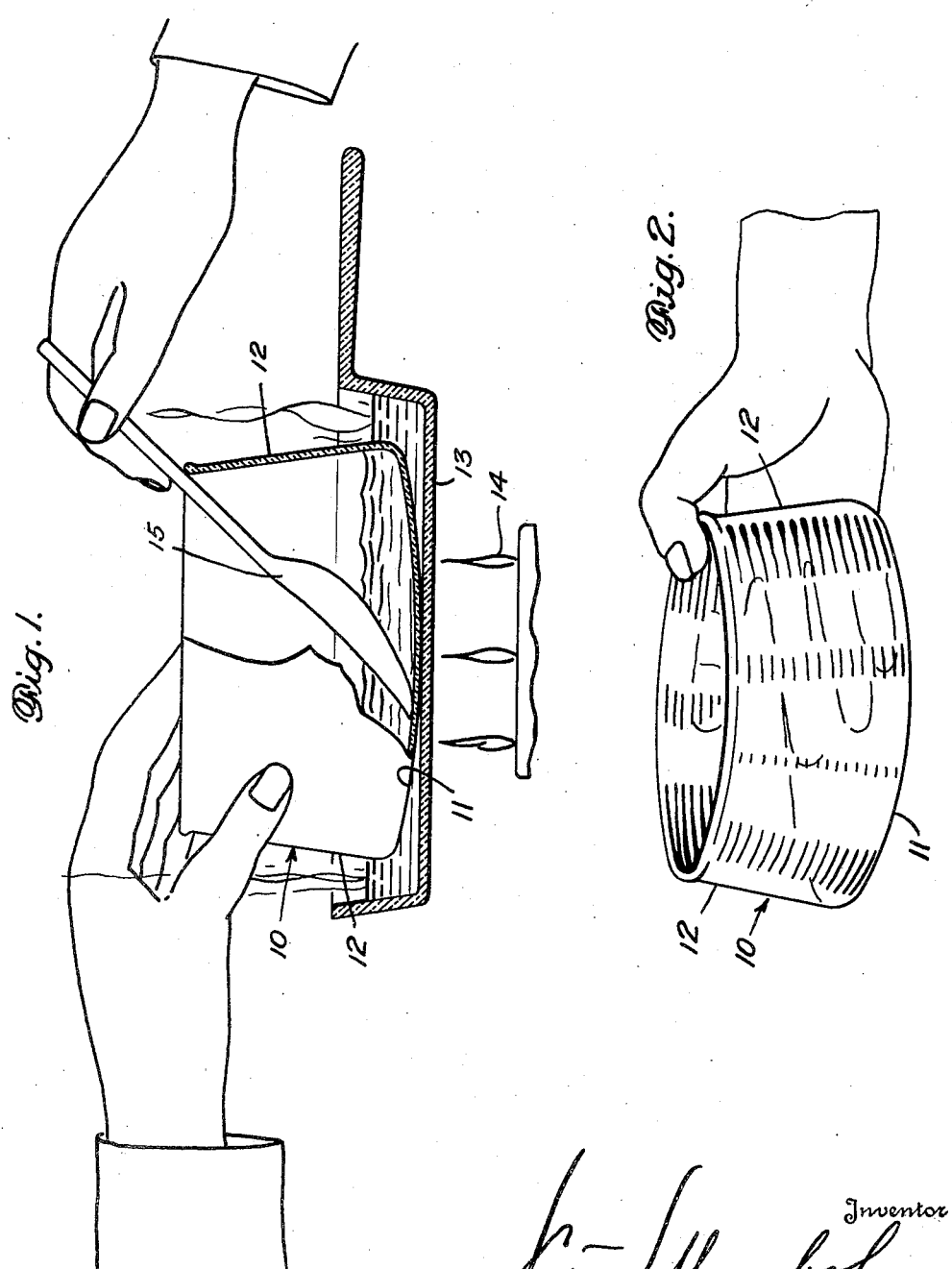
Inventor
Peter Schlumbohm
By
KARL W. FLOCKS
ATTORNEY Patented Dec. 27, 1949

2,492,892

UNITED STATES PATENT OFFICE 2,492,892

ROUNDED BOTTOM INNER DISH FOR DOUBLE BOILERS

Peter Schlumbohm, New York, N. Y.

Application February 11, 1944, Serial No. 521,985

1 Claim. (Cl. 126—387)

This invention relates to dishes and more particularly to a dish suitable for the cooking, storing, and serving of food and for general use in the laboratory.

Prior to the instant invention, dishes have been made of designs which more or less suit a specific purpose and, accordingly, they have little if any versatility. For example, prior dishes, while suitable for holding food on the table, have not been particularly suitable for use as refrigerator containers because they are relatively clumsy to handle in stacks. Specially designed refrigerator sets are not particularly adapted for the serving of food on a table. Cups specifically designed for stacking purposes are provided with handles which take up valuable space which could be used for other purposes.

It is an object of the instant invention to provide a versatile dish of novel design having a convex bottom.

It is another object of the instant invention to provide a dish of novel design having a low center of gravity.

It is still another object of the instant invention to provide a dish suitable for the cooking, storing, and serving of food.

It is a further object of the instant invention to provide a new laboratory dish of heat resisting glass.

Other objects and the nature and advantages of the invention will be apparent from the following description taken in conjunction with the accompanying drawings, wherein:

Figure 1 is a view partly in section and partly in elevation of the dish in accordance with the invention inserted into a shallow hot water bath; and Fig. 2 is a view in perspective showing the dish being gripped by the hand of the user.

Referring to the drawings, the invention is illustrated, by way of example, in Figures 1 and 2.

The new dish 10 depicted in the drawings is made from heat resisting glass by a glass blowing process. A preferred size of the dish involves a maximum diameter adjacent the convex bottom 11 thereof of approximately 5" and a height of approximately 3". In addition to the convex bottom, the dish comprises side walls 12 that taper inwardly as they extend upwardly in the shape of a truncated cone, the smaller diameter of which occurs at the open top.

Though certain advantages of the new dish inure from the convex shaped bottom, the cooperation of the bottom shape with the side wall shape provides extraordinary handiness and usefulness.

From the point of view of the physicist, the double boiler action of the new dish as illustrated in Fig. 1, is of particular interest and it is of significance to observe the effect of the convex bottom 11 of the dish when the dish is placed into the shallow hot water bath as offered by a water filled pan 13 over a flame 14. Because of the "point contact," the water vapor bubbles can evolve evenly and a very smooth action of the process results in contrast to the explosion-like action of steam which is evolved by flash evaporation or by delayed superheated evaporation as occurs if a dish with a flat bottom is used in a similar water bath.

It is also of significance that as the process illustrated in Fig. 1 takes place, a slight rocking action of the dish occurs due to the effect of the steam bubbles which rocking action assists in heating the contents of the dish by the stirring thereof.

The conical walls 12 of the dish 10 cooperate with the walls of the water pan 13 by offering a widening path to the evolving steam bubbles thereby contributing to the quiet operation of the water bath.

The dish being made with an even wall thickness, the convex bottom of the outside thereof makes for a concave inner bottom wall which in turn is ideally suited for cooperation with the convex bottom of a conventional spoon 15. Accordingly, the structure is particularly adapted for the grinding of powders on the bottom of the dish and for the making of sauces in the dish located in a water bath as shown in Figure 1.

The conical shape of the side walls of the dish cooperates with the hand of the user in several ways. As shown in Fig. 1, the left hand can exercise downward pressure by gripping the dish in the zone of smallest diameter. In utilizing the dish 10 in upside down position, for example, as a cover, the hand of the user may take advantage of the undercut profile of the side walls for a perfect grip. With the fingers gripping the side walls and the palm of the hand across the bottom, this perfect grip is effective whether the dish be in its normal position with the bottom of the dish at the bottom or in upside down position. As shown in Fig. 2, the conical side wall offers a "natural" grip to the index finger supplementing the firm grip afforded the thumb over the edge of the dish and the three remaining fingers pressing against the convex bottom. An effective and firm three-way lock grip is thus created by the convex bottom, the conical side wall, and the limitation of the height of the dish to the span of the hand.

The convex bottom 11 of the dish 10 cooperates with the retracting conical side walls 12 in that the center of gravity of the dish 10 is lowered by this configuration of the upwardly and inwardly extending side walls 12 and in spite of the rockable bottom 11 the dish 10 has remarkable qualities of stability.

Because of the retracted walls and low center of gravity the convex bottom can be easily and readily "centered" when placed on the racks of a stove. This is important because the heat of the flame will "attack" the bottom of the dish at its center and the thermal expansion of the material will occur in concentric zones resulting in a minimum of stress.

A feature of the invention resides in selecting a convex bottom, the curvature of which corresponds to a relatively large radius. As a practical example, a radius of 20" has been selected. In order to make the invention clear, reference is made to well known laboratory flasks and it is pointed out that the new dish combines the advantages of a round boiling flask, an Erlenmeyer flask, and the accessibility and "cleanability" of an evaporating dish.

In order to clarify what is meant by a relatively large radius of the bottom wall, it may be compared with the radius of the bottom of a boiling flask of the same volumetric content. The radius of curvature of the bottom wall of the new dish should always be more than twice the radius of curvature of a spherical boiling flask of the same volumetric content. I have found that best results are obtained if the radius of the dish in accordance with the invention, is from between four to ten times as large as the radius of curvature of a spherical boiling flask of the same volumetric content and seven times as large as an optimum size. In accordance with the invention the radius of curvature of the bottom wall is larger than the largest radius of the truncated cone formed by the side walls of the dish.

A large radius of curvature of the bottom wall makes for maximum stability with a minimum of taper in the side wall and it also involves an advantage when a dish so constructed is used as a pot or pan on stoves in which the flame or resistance wire is adjusted to the distance from what ordinarily would be the flat bottom of a conventional pan or pot. An additional advantage of the dish in accordance with the invention incorporating a large radius of curvature in its convex bottom, lies in the minimum of optical distortion caused by this wall when foods are viewed therethrough as, for example, in a refrigerator set. The optical clarity of this blown glass dish makes for a tremendous improvement over conventional pressed glassware now used in refrigerator sets. In addition, the dish in accordance with the invention is attractive enough to serve food in to the table. This naturally will result in quite a saving of dishwashing, particularly when such dish can serve the triple function of storing left-over food in the refrigerator, being utilized for the heating of food in a "bain-marie" manner or over a direct flame, and subsequently being utilized for the serving of food on the table.

It will be obvious to those skilled in the art that various changes may be made without departing from the spirit of the invention and therefore the invention is not limited to what is shown in the drawings and described in the specification but only as indicated in the appended claim.

What is claimed is:

A double-boiler comprising a cooking dish and a relatively flat bottom vessel containing water in the bottom thereof, said dish having a bottom wall and side walls, said side walls having on their outside the contour of a truncated cone, so that the side walls extend upwardly and inwardly while providing a relatively large top opening, the outside of said bottom wall being contoured like a convex lens and having only a small center part of its bottom surface in contact with said flat bottom vessel, said bottom wall having an outside shape corresponding to a portion of the surface of a sphere bounded by a circle which circle has a diameter less than the diameter of the sphere, said bottom wall at its periphery being at a higher level than the central portion thereof, said dish having great stability in said flat bottom vessel and having a volumetric capacity considerably in excess of the volume of the dish below the highest horizontal plane through the convex bottom wall.

PETER SCHLUMBOHM.

REFERENCES CITED

The following references are of record in the file of this patent:

UNITED STATES PATENTS

| Number | Name | Date |
| --- | --- | --- |
| D. 108,788 | Kostellow | Mar. 15, 1938 |
| 63,653 | Rand | Apr. 9, 1867 |
| 79,574 | Johnson | July 7, 1868 |
| 129,613 | Sterick | July 16, 1872 |
| 193,010 | Lucas | July 10, 1877 |
| 232,842 | Pairpoint | Oct. 5, 1880 |
| 388,500 | Parker | Aug. 28, 1888 |
| 919,468 | Royer | Apr. 27, 1909 |
| 1,070,516 | O'Brien | Aug. 19, 1913 |
| 1,089,164 | Szunyik | Mar. 3, 1914 |
| 1,146,313 | Duffy | July 13, 1915 |
| 1,199,603 | Parsons | Sept. 26, 1916 |
| 1,220,495 | Cadby | Mar. 27, 1917 |
| 1,299,963 | Laquai | Apr. 8, 1919 |
| 1,304,622 | Sullivan et al. | May 27, 1919 |
| 1,316,006 | Wagner | Sept. 16, 1919 |
| 1,383,971 | Biette | July 5, 1921 |
| 1,543,800 | Shewry | June 30, 1925 |
| 1,600,132 | Pearl | Sept. 14, 1926 |
| 1,659,383 | Thiene et al. | Feb. 14, 1928 |
| 2,025,333 | Richheimer | Dec. 24, 1935 |
| 2,069,089 | Goldman et al. | Jan. 26, 1937 |
| 2,088,319 | Comstock | July 27, 1937 |

FOREIGN PATENTS

| Number | Country | Date |
| --- | --- | --- |
| 22,871 | Great Britain | Oct. 3, 1910 |
| 25,486 | Great Britain | Nov. 12, 1906 |
| 27,912 | Switzerland | May 6, 1903 |
| 70,231 | Germany | Aug. 8, 1893 |
| 586,105 | Germany | Oct. 17, 1933 |
| 776,589 | France | Nov. 8, 1934 |

OTHER REFERENCES

Gen. Catalog of Lab. Apparatus etc., Central Scientific Co., Chicago. Copyright 1941. Copy in Design Div., U. S. Patent Office, May 3, 1941, page 696 cited.